(12) United States Patent
Takahashi

(10) Patent No.: US 7,854,521 B2
(45) Date of Patent: Dec. 21, 2010

(54) PROJECTOR

(75) Inventor: Susumu Takahashi, Iruma (JP)

(73) Assignee: Olympus Corporation, Tokyo (JP)

( * ) Notice: Subject to any disclaimer, the term of this patent is extended or adjusted under 35 U.S.C. 154(b) by 838 days.

(21) Appl. No.: 11/644,147

(22) Filed: Dec. 22, 2006

(65) Prior Publication Data

US 2007/0153237 A1 Jul. 5, 2007

(30) Foreign Application Priority Data

Dec. 28, 2005 (JP) ............................ 2005-377867
Dec. 28, 2005 (JP) ............................ 2005-377868

(51) Int. Cl.
*G03B 21/00* (2006.01)
(52) U.S. Cl. ........................................ 353/122; 353/97
(58) Field of Classification Search ................... 353/31, 353/29, 122; 362/554, 551; 385/115, 141, 385/142
See application file for complete search history.

(56) References Cited

U.S. PATENT DOCUMENTS

| | | | | |
|---|---|---|---|---|
| 5,260,815 | A | * | 11/1993 | Takizawa .................... 349/159 |
| 5,633,755 | A | | 5/1997 | Manabe et al. |
| 6,272,269 | B1 | * | 8/2001 | Naum .......................... 385/43 |
| 7,020,378 | B2 | * | 3/2006 | Poisel et al. ................. 385/141 |
| 7,260,297 | B2 | * | 8/2007 | Hajto et al. ................. 385/115 |
| 2003/0151727 | A1 | * | 8/2003 | Glent-Madsen et al. ....... 353/94 |
| 2007/0252954 | A1 | * | 11/2007 | McGuire et al. .............. 353/20 |

FOREIGN PATENT DOCUMENTS

| | | |
|---|---|---|
| JP | 08-201755 | 8/1996 |
| JP | 08-251520 | 9/1996 |
| JP | 2001-249400 | 9/2001 |

* cited by examiner

*Primary Examiner*—Georgia Y Epps
*Assistant Examiner*—Jerry Brooks
(74) *Attorney, Agent, or Firm*—Kenyon & Kenyon LLP

(57) ABSTRACT

There is provided a projector having a point light source disposed to an edge of an optical fiber for transmitting exciting light and including a fluorescent illuminant for emitting fluorescence by being exited by the exiting light, a light collecting optical system for collecting the fluorescence emitted from the point light source, a reflective display device for reflecting the fluorescence collected by the light collecting optical system and overlapping the fluorescence with an image signal, an outgoing aperture for stopping down the fluorescence overlapped with the image signal by the reflective display device, wherein the outgoing aperture and the point light source are disposed side by side in the vicinity of the front focusing surface of the light collecting optical system. With this arrangement, a bright projected image can be obtained while disposing the outgoing aperture and the point light source sufficiently near to each other, reducing aberration, and reducing the diameter of a collecting lens so that the overall size of the projector can be reduced.

5 Claims, 8 Drawing Sheets

PROJECTOR

BACKGROUND OF THE INVENTION

1. Field of the Invention

This application is based on Japanese Patent Applications Nos. 2005-377867, and 2005-377868, the content of which is incorporated herein by reference.

2. Description of Related Art

The present invention relates to a projector.

Conventionally, there is known a projector arranged such that a reflective display device such as a digital micromirror device (Trademark)(DMD (Trademark)) and a collecting lens are disposed side by side in an optical axis direction, and an aperture diaphragm and an illuminating light diaphragm are disposed at the front focusing position of the collecting lens in a direction orthogonal to the optical axis (refer to, for example, Japanese Unexamined Patent Application Publication No. 8-251520). Further, there is also disclosed a projector which has no illuminating light diaphragm and has a point light source arranged by focusing an image of a lamp light source on a focusing surface of a collecting lens by collecting the illuminating light emitted from the light source (refer to, for example, Japanese Unexamined Patent Application Publication No. 8-201755).

Further, there is conventionally known a projector arranged such that the light from a light source apparatus such as a xenon lamp and the like is caused to pass through a display device such as a transmissive liquid crystal panel or is reflected by a reflective display device such as a digital micromirror device (Trademark) so that light is overlapped with an image signal and then an image is projected through a projecting lens (refer to, for example, Japanese Unexamined Patent Application Publication No. 2001-249400).

In these projectors, basically, the illuminating light from a point light source, which is formed by collecting the light from a lamp light source by an elliptic mirror and an optical system, or the illuminating light from a point light source, which is formed by an illuminating light diaphragm disposed at the focusing position of an elliptic mirror, is deflected by a mirror so that the illuminating light is incident on a collecting lens. Accordingly, the mirror disposed on a light path of the illuminating light must have a size and a position which do not shut off the light outgoing from an aperture diaphragms disposed on a focusing surface in juxtaposition.

However, there is a disadvantage in that since a relatively large mirror must be disposed actually, a relatively large interval must be secured between the illuminating light diaphragm and the aperture diaphragm or between the image of the lamp light source and the aperture diaphragm.

That is, when the interval is increased, the amount of decentration of the optical axis of the illuminating light which is incident on and outgoes from the collecting lens increases, which is disadvantageous in that aberration is increased. Further, there is also a drawback in that the diameter of collecting lenses disposed at intervals along an optical axis must be increased to retrieve the illuminating light which is incident on and outgoes from the collecting lens as much as possible.

Further, when it is intended to obtain a point light source having high brightness using a lamp light source, there is also a disadvantage in that since the lamp light source is increased in size as well as accessories such as a cooling fan and the like for suppressing heat generated by the lamp light source are also increased in size, a projector is increased in size in its entirety.

Further, since the light source apparatus such as a xenon lamp and the like are placed in a high temperature state as described above due to the heat generated thereby, they must be forcibly cooled by a cooling fan and the like. Accordingly, there is a drawback in that the sound generated by the cooling fan when it is driven in rotation is noisy. Further, hot air is discharged from the light source apparatuses to the outside by the cooling fan.

Accordingly, in a small and closed looking/listening space such as a vehicle compartment, a problem arises in that the S/N ratio of sound of images is greatly increased by the noise of the cooling fan, and further the temperature of the compartment is increased by the hot air discharged from the fan. Further, since the projector includes components occupying a relatively large space, for example, the lamp such as the xenon lamp and the like of the light source apparatus, the cooling fan, and the optical system including lenses and the like, there is also a problem in that the projector is increased in size and thus it is difficult to dispose it in the small looking/listening space.

BRIEF SUMMARY OF THE INVENTION

An object of the present invention, which was made in view of the circumstances described above, is to provide a projector in which an outgoing aperture and a point light source are disposed sufficiently near to each other, aberration is reduced, the diameter of a collecting lens is reduced, and a bright projected image can be obtained while reducing the overall size of the projector.

Further, an object of the present invention, which was made in view of the circumstances described above, is to provide a projector which previously prevents occurrence of such a disadvantage that the looking/listening environment in a looking/listening space is deteriorated by the noise and hot air generated by a light source apparatus, can be installed even in a small looking/listening space, and can realize a comfortable looking/listening environment.

To achieve the above object, the present invention provides the following means.

A first embodiment of the present invention provides a projector having a point light source disposed to an edge of an optical fiber for transmitting exciting light and including a fluorescent illuminant for emitting fluorescence by being exited by the exiting light, a light collecting optical system for collecting the fluorescence emitted from the point light source, a reflective display device for reflecting the fluorescence collected by the light collecting optical system and overlapping the fluorescence with an image signal, an outgoing aperture for stopping down the fluorescence overlapped with the image signal by the reflective display device, wherein the outgoing aperture and the point light source are disposed side by side in the vicinity of the front focusing surface of the light collecting optical system.

According to the first embodiment of the present invention, when the exciting light transmitted through the optical fiber is emitted from the edge face thereof, the fluorescent illuminant disposed to the edge face of the optical fiber is excited and emits fluorescence. Since the point light source is disposed in the vicinity of the front focusing surface of the light collecting optical system, the fluorescence is made to approximately parallel light by being caused to pass through the light collecting optical system and is incident on the reflective display device. In the reflective display device, when the fluorescence emitted from the point light source is reflected, the image signal is overlapped with the fluorescence. Then, the fluorescence of the approximately parallel light, with which the image signal is overlapped, is collected by being caused to pass through light collecting optical system again and projected to the outside after it is caused to pass through the outgoing aperture disposed in the vicinity of the focusing surface.

In this case, according to the first embodiment of the present invention, the optical fiber has a very small outside diameter of several microns to several tens of microns as well as the fluorescent illuminant emits fluorescence having very high intensity. Accordingly, the point light source having the small outside diameter and high brightness is arranged. With this arrangement, it is not necessary to dispose a relatively large component such as a mirror, which causes illuminating light emitted by a large light source to be incident on a collecting lens, on a light path, and even if the edge face of the optical fiber is directly disposed to the focusing surface of the collecting lens, the light outgoing from the outgoing aperture is not shut off.

Accordingly, the outgoing aperture and the point light source disposed in the vicinity of the front focusing surface of the light collecting optical system can be disposed as near as possible to each other. As a result, it is possible to sufficiently reduce the amounts of decentration of the incident optical axis of the fluorescence from the point light source and the outgoing optical axis of the fluorescence to the outgoing aperture with respect to the optical axis of the light collecting optical system.

In the first embodiment of the present invention, the fluorescent illuminant may emit white fluorescence or may emit fluorescence of at least 3 R (red), G (green), B (blue) colors. When the fluorescent illuminant emits at least 4 colors, color reproducibility can be more enhanced.

Further, in the first embodiment of the present invention it is preferable that the reflective display device is a digital micromirror device (Trademark) or a reflective liquid crystal display device. With is arrangement, since the light path is returned by the reflective display device, the overall length of the projector head can be reduced. Further, it is possible to overlap the image signal that changes at a high speed with the illuminating light by the digital micromirror device (Trademark).

As described above, according to the first embodiment of the present invention, there can be achieved an advantage in that the outgoing aperture and the point light source are disposed sufficiently near to each other, aberration is reduced, the diameter of the collecting lens is reduced, and a bright projected image can be obtained while reducing the overall size of the projector.

A second embodiment of the present invention provides a projector having a light source apparatus for emitting illuminating light, a projector head for overlapping the illuminating light emitted by the light source apparatus with an image signal and projecting the illuminating light, and an optical fiber for connecting the light source apparatus to the projector head and supplying the illuminating light emitted from the light source apparatus to the projector head, wherein the projector head includes a display device for overlapping the image signal with the illuminating light emitted from the light source apparatus and a projecting lens for projecting the illuminating light with which the image signal is overlapped by the display device.

According to the second embodiment of the present invention, the illuminating light emitted from the light source apparatus is transmitted to the projector head through the optical fiber. In the projector head, the illuminating light transmitted thereto is overlapped with the image signal by the operation of the display device and projected to the outside by the projecting lens.

In this case, according to the second embodiment of the present invention, since the projector head is separated from the light source apparatus, the light source apparatus can be disposed at a position distant from the projector head. Since the light source apparatus, which generates heat and noise, is disposed at the position distant from the projector head disposed in the looking/listening space, a problem of noise and an increase of temperature in the looking/listening space can be solved, thereby a comfortable looking/listening environment can be realized.

Further, according to the second embodiment of the present invention, the size of the projector head itself can be reduced by separating the light source apparatus whose size is liable to be increased by a lamp, an optical system, a cooling fan, and the like from the projector head. As a result, since it is sufficient to dispose the small projector head in the looking/listening space, even if the looking/listening space is small, a large installation space is not necessary. Further, since the projector head is connected to the light source apparatus through the flexible optical fiber, the projector head can be optionally moved with respect to the light source apparatus, thereby it is easy to turnably install the projector head and to change a projecting position.

In the second embodiment of the present invention, the light source apparatus may have a laser light source, and the projector head may have a fluorescent illuminant for converting the laser light emitted from an edge face of the optical fiber into visible light.

With this arrangement, when the laser light emitted from the light source apparatus as the laser light source is transmitted to the projector head through the optical fiber, the laser light emitted from the edge face of the optical fiber is incident on the fluorescent illuminant disposed in the projector head, and visible light is emitted therefrom. Then, the image signal is overlapped with the emitted visible light by the display device, and the visible light is projected to the outside by the projecting lens. Since the laser light is transmitted in the optical fiber, it can be effectively transmitted while reducing a loss as well as it can be converted into the visible light having high intensity in the projector head, thereby a bright image can be projected.

In the second embodiment of the present invention, the fluorescent illuminant may emit white fluorescence or may emit fluorescence of at least 3 R (red), G (green), B (blue). When the fluorescent illuminant emits at least 4 colors, color reproducibility can be more enhanced.

Further, in the second embodiment of the present invention, it is preferable that the display device be a reflective display device. In this case, it is preferable that the display device be a digital micromirror device (Trademark). With this arrangement, since the light path is returned by the reflective display device, the overall length of the projector head can be reduced. Further, it is possible to overlap an image signal that changes at a high speed with illuminating light by the digital micromirror device (Trademark).

In the second embodiment of the present invention, the display device may be a transmissive display device.

With this arrangement, the edge face of the optical fiber, the display device, and the projecting lens can be disposed on a straight line, and the projector head can be arranged slender although the overall length of the projector head is increased.

As described above, according to the second embodiment of the present invention, there can be achieved an advantage in that occurrence of such a disadvantage that the looking/listening environment in a looking/listening space is deteriorated by the noise and hot air generated by a light source can be previously prevented, the projector can be installed in a small looking/listening space, a comfortable looking/listening environment can be realized.

DETAILED DESCRIPTION OF THE INVENTION

First Embodiment

Figure 1:
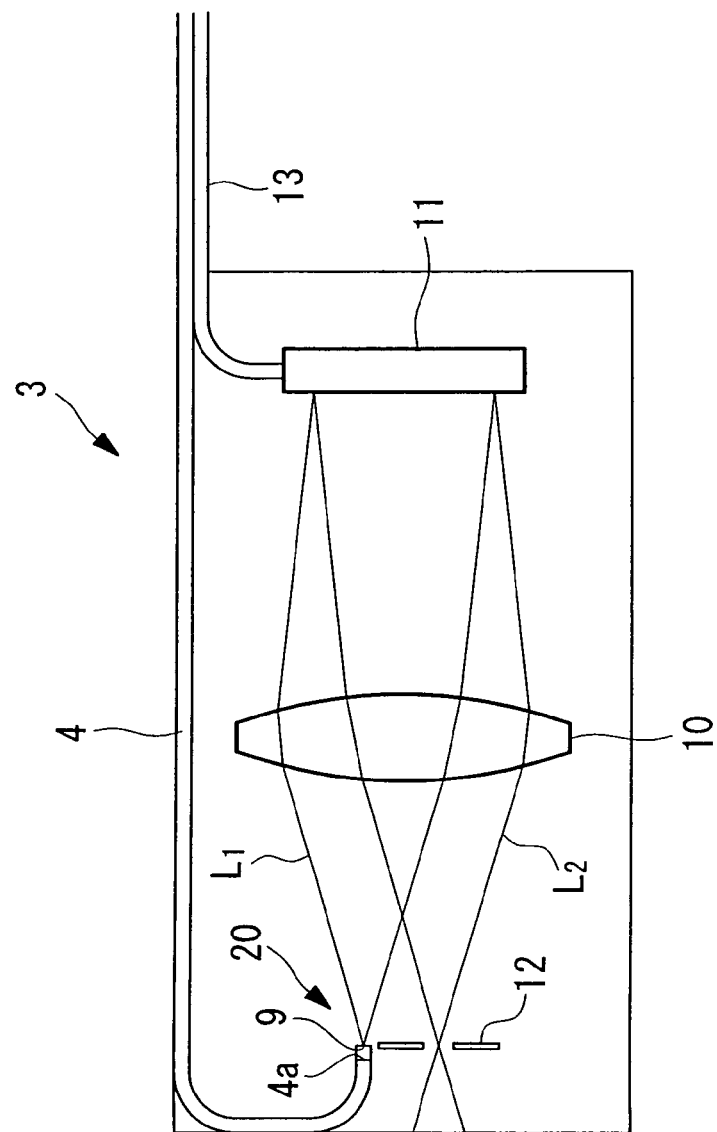
FIG. 1 a view schematically showing a projector head of a projector according to a first embodiment of the present invention.

A projector according to a first embodiment of the present invention will be described below referring to FIGS. 1 and 2.

Figure 2:
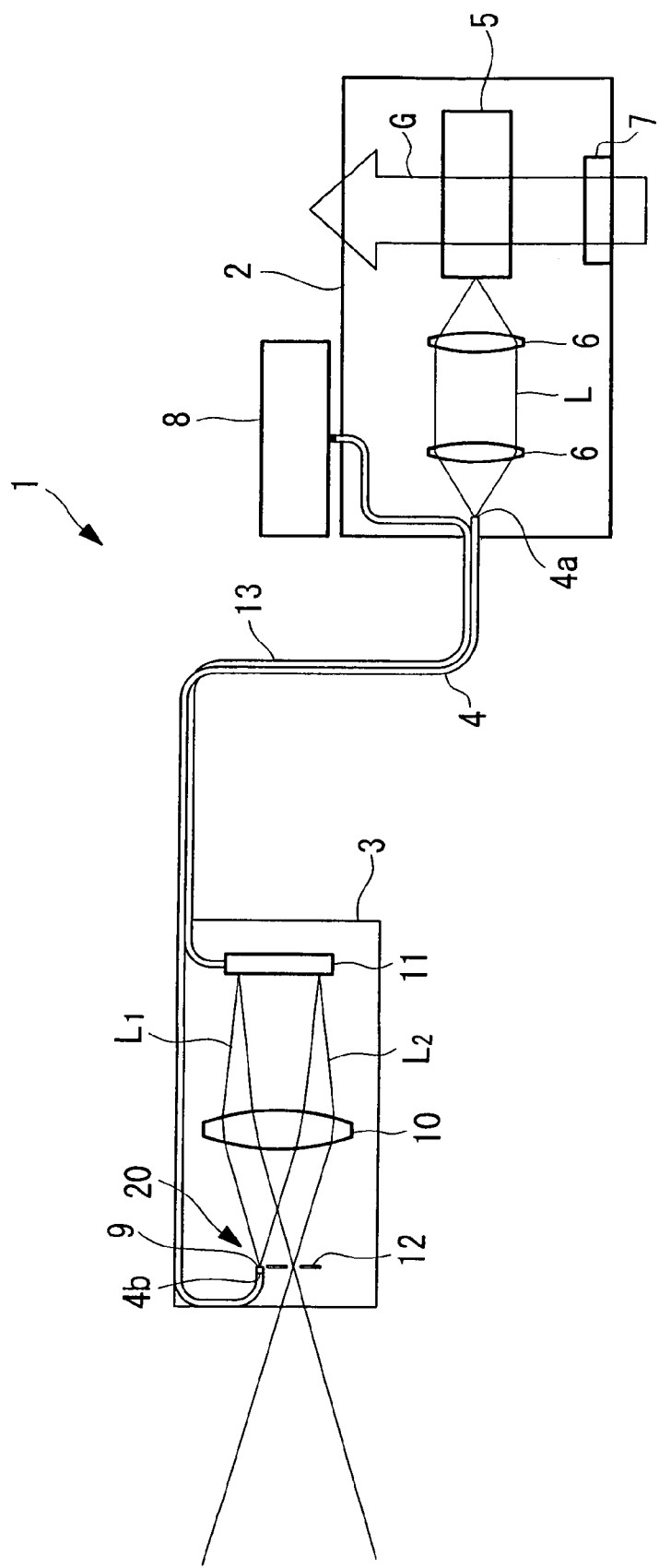
FIG. 2 is an overall arrangement view schematically showing the projector having the projector head of FIG. 1.

As shown in FIG. 2, the projector 1 according to the embodiment includes a light source apparatus 2, a projector head 3, and a flexible optical fiber 4 for connecting the light source apparatus 2 to the projector head 3.

The light source apparatus 2 includes a laser light source 5 and coupling lenses 6 for collecting the laser light (exciting light) L emitted from the laser light source 5. Since the laser light source 5 generates heat in operation, the light source apparatus 2 is provided with a cooling fan 7 for carrying out forcible cooling by, for example, an air flow G. Further, a controller 8 is disposed to the light source apparatus 2 to control a digital micromirror device (Trademark) 11 of the projector head 3 to be described later.

The optical fiber 4 is, for example, a multimode fiber having an edge face 4a disposed to a light collecting position at which the laser light L is collected by the coupling lenses 6 and the other edge face 4b disposed to the projector head 3.

A fluorescent illuminant 9, which emits white light $L_1$ by being excited by the laser light L, are disposed to the edge face 4b of the optical fiber 4 disposed in the projector head 3. With this arrangement, a point light source 20 with a very small diameter, which emits the white light $L_1$ is arranged at the position of the edge face 4b of the optical fiber 4.

Further, a collecting lens (light collecting optical system) 10 for collecting the white light $L_1$ emitted from the point light source 20, the digital micromirror device (Trademark) 11 for reflecting the white light $L_1$ converted into approximately parallel light by the collecting lens 10, and an outgoing aperture 12 disposed in juxtaposition with the point light source 20 are disposed in the projector head 3. The point light source 20 and the outgoing aperture 12 are disposed in juxtaposition with the front focusing surface of the collecting lens 10.

The digital micromirror device (Trademark) 11 is connected to the controller 8 through wirings 13 and has a plurality of micromirrors (not shown) which are turned on and off in response to an image signal transmitted from the controller 8. The inclining angles of respective micromirrors can be switched so that the white light $L_1$ is reflected in a different direction depending on an on-state and an off-state, thereby the image signal can be overlapped with the reflecting white light $L_2$.

Operation of the projector 1 according to the embodiment arranged as described above will be explained.

According to the projector 1 of the embodiment, the laser light L emitted from the laser light source 5 of the light source apparatus 2 is transmitted to the projector head 3 through the optical fiber 4. In the projector head 3, when the laser light L is emitted from the edge face 4b of the optical fiber 4, the fluorescent illuminant 9 is excited by the laser light L, thereby the white light $L_1$ is emitted. The point light source 20 composed of the fluorescent illuminant 9 disposed to the edge face 4b of the optical fiber 4 are disposed to the front focusing surface of the collecting lens 10. Accordingly, the white light $L_1$ emitted from the point light source 20 is converted into the approximately parallel light by being passed through the collecting lens 10 and is incident on the digital micromirror device (Trademark) 11.

The digital micromirror device (Trademark) 11 turns on and off the respective micromirrors in a pattern according to the image signal transmitted from the controller 8. As a result, the image signal according to the pattern of the micromirrors is overlapped with white light $L_2$ reflected by the digital micromirror device (Trademark) 11, wherein the white light $L_2$ is reflected in a mode of approximately parallel light and caused to pass through the collecting lens 10 again.

The white light $L_2$, which was overlapped with the image signal and passed through the collecting lens 10, is collected by the collecting lens 10 and caused to pass through the outgoing aperture 12 disposed to the front focusing surface of the collecting lens 10. With this operation, an image displayed by the digital micromirror device (Trademark) 11 is projected onto an arbitrary projecting surface disposed to the outside of the projector head 3.

According to the projector 1 of the embodiment, the very minute point light source 20 with high brightness is composed of the optical fiber 4 and the fluorescent illuminant 9 disposed to the edge face 4b thereof. Therefore, even if the point light source 20 is disposed near to the outgoing aperture 12 in a direction orthogonal to the optical axis of the collecting lens 10, the white light $L_2$ emitted from the outgoing aperture 12 can be prevented from being shut off by the point light source 20. As a result, since it is possible to dispose the point light source 20 near to the outgoing aperture 12, the amounts of decentration of the incident and outgoing optical axes of the white light $L_1$, $L_2$ to the collecting lens 10 can be reduced. Therefore, there is an advantage in that aberration caused by an increase of decentration can be suppressed and an image without distortion can be projected.

Further, the diameter of the collecting lens 10 can be reduced by disposing the point light source 20 near to the outgoing aperture 12. As a result, the projector head 3 can be arranged slender. Thus, the projector head 3 can be disposed such that it does not get in the way even in the small compartment of the vehicle and the like.

Further, according to the embodiment, since light paths of the white light $L_1$, $L_2$ are returned by the digital micromirror device (Trademark) 11, the collecting lens 10 can be shared with a result that a cost can be reduced by reducing the number of optical parts as well as the length of the projector head 3 can be reduced in the optical axis direction.

Further, in the embodiment, the projector head 3 disposed in a looking/listening environment is separated from the light source apparatus 2 and connected thereto by the optical fiber 4 and the wirings 13. With this arrangement, the light source apparatus 2, which acts as a heat generating source and a noise source can be disposed to the outside of the looking/listening environment. As a result, a decrease of an S/N ratio and an increase of a temperature in the looking/listening environment caused by the light source apparatus 2 can be prevented. In particular, when the projector 1 is used as a vehicle-mounted projector, it is possible to dispose the light source apparatus 2, which acts as the noise source and the heat generating source, in a trunk room and the like externally of a compartment, thereby the looking/listening environment in the small and closed compartment can be enhanced.

The projector head 3 can be turnably mounted easily by connecting the light source apparatus 2 to the projector head 3 by the flexible optical fiber 4 and the wirings 13, thereby a degree of freedom when the projector head 3 is mounted can be enhanced. Further, there is also an advantage in that audiences can optionally adjust the position and the attitude of the projector head 3 in conformity with the projecting surface P.

Note that, in the projector 1 according to the embodiment, although the digital micromirror device (Trademark) 11 is exemplified as a reflective display device, a reflective liquid crystal display device may be employed in pace of it. Since the point light source 20 can be disposed near to the outgoing aperture 12, an arrangement similar to the above arrangement can be employed even by the reflective liquid crystal display device in which the inclining angles of pixel surfaces do not change.

Further, although illuminants for emitting the white light $L_1$ are exemplified as the fluorescent illuminant 9, an illuminant for converting the white light $L_1$ into visible light of 3 RGB colors may be employed, and three laser light sources 5 and three single mode fibers or multimode fibers 4, which supply the laser light L to the fluorescent illuminant 9, may be prepared. With this arrangement, it is possible to use all the micromirrors of the digital micromirror device (Trademark) 11 to each of the 3 RGB colors, thereby a sophisticated image signal can be overlapped with fluorescence. Note that, in this case, the laser light source 5 must be switched in synchronism with an image which is to be displayed on the digital micromirror device (Trademark) 11 and switched by the controller 8. Further, colors other than the 3 RGB colors may be emitted in addition to the 3 RGB colors. With this arrangement, color reproducibility can be enhanced.

Figure 3:
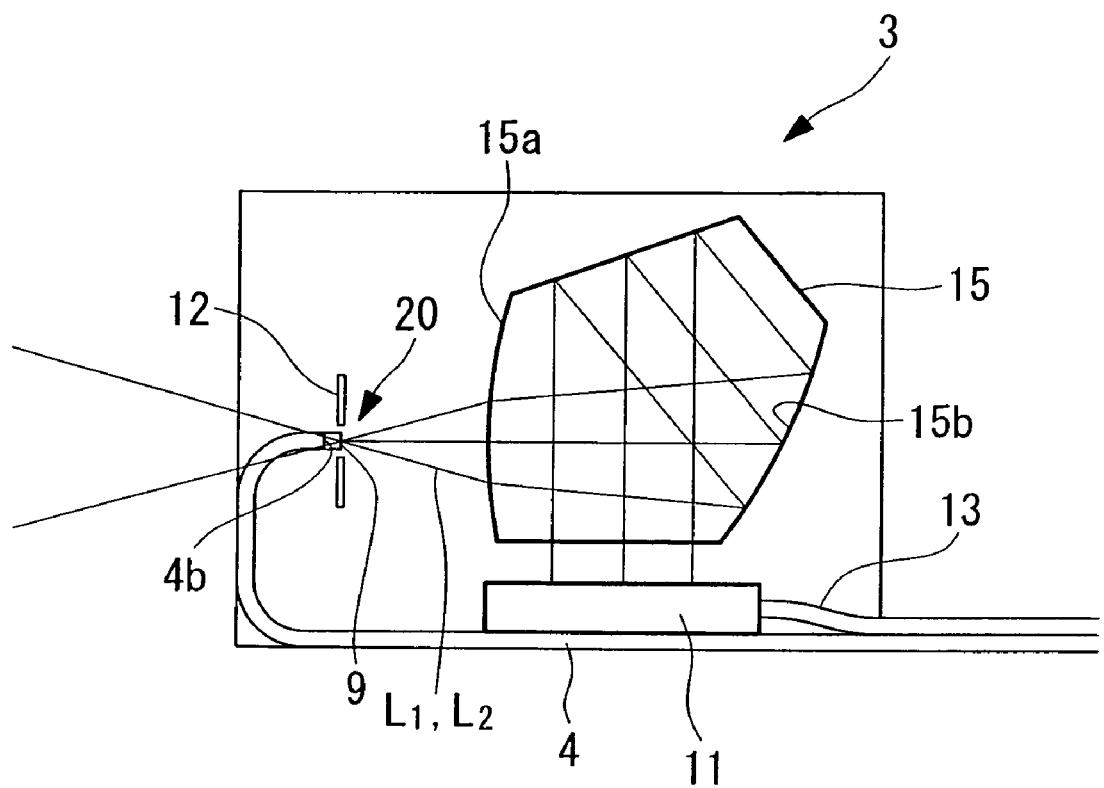
FIG. 3 is a view schematically showing a modification of the projector head of FIG. 1.

As shown in FIG. 3, a prism 15 having an imaging action may be employed to an incident surface 15a and a reflecting surface 15b in place of the collecting lens 10. With this arrangement, since the light path can be folded back, the projector can be made more compact. In FIG. 3, the point light source 20 and the outgoing aperture 12 are disposed at positions dislocated in a direction orthogonal to a sheet surface.

Further, it is possible to form the front focusing surface nearer to the prism 15 by increasing the imaging action of the incident surface 15 and the reflecting surface 15b, thereby the projector head 3 can be arranged more compact.

Second Embodiment

A projector according to a second embodiment of the present invention will be described below referring to FIG. 4.

Hereinafter, the same or similar components as those of the first embodiment will be described using the same reference numeral.

Figure 4:
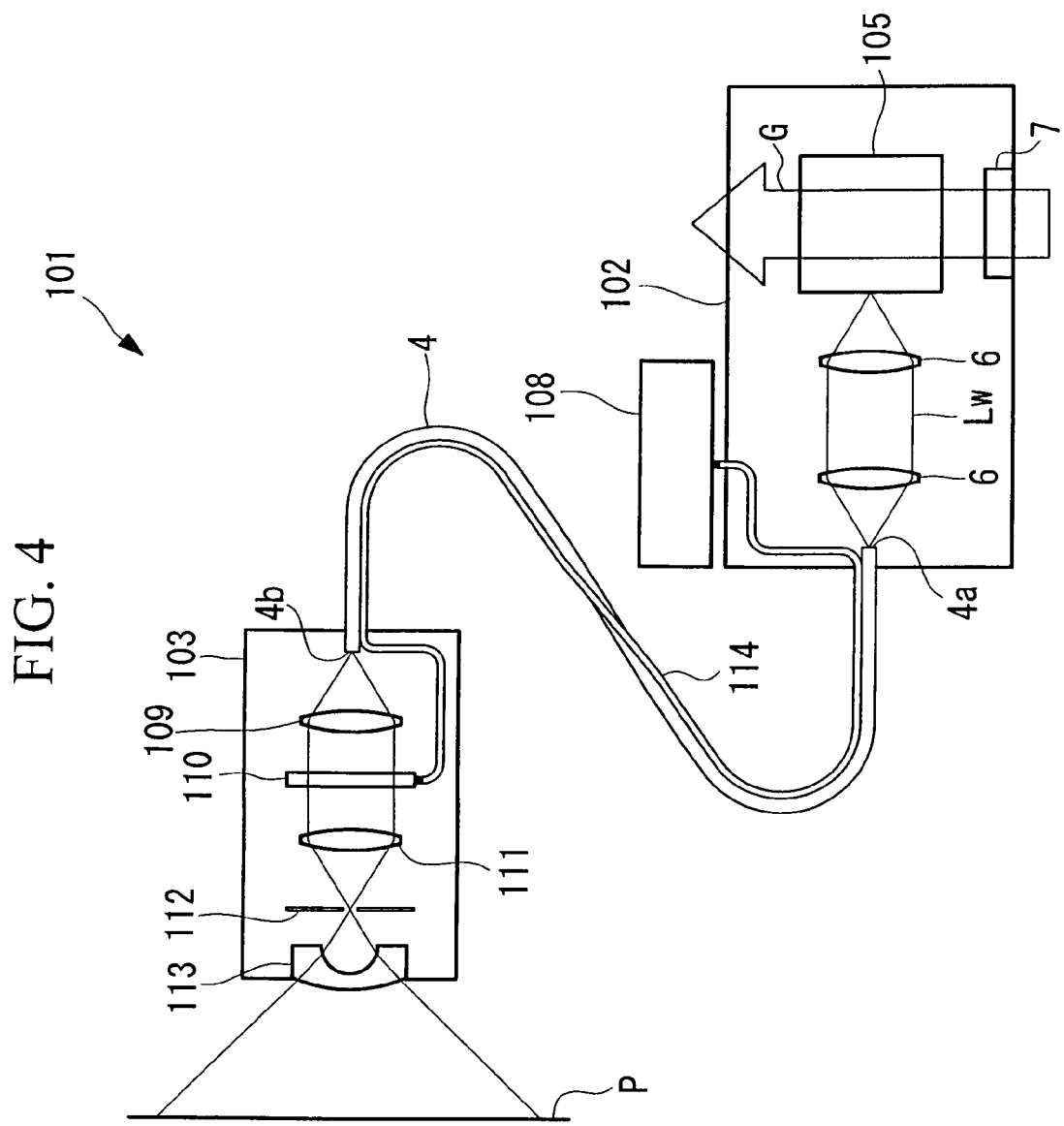
FIG. 4 a view schematically showing an overall arrangement of a projector according to a second embodiment of the present invention.

As shown in FIG. 4, the projector 101 according to the embodiment includes a light source apparatus 102, a projector head 103, and a flexible optical fiber 4 for connecting the light source apparatus 102 to the projector head 103.

The light source apparatus 102 includes a xenon lamp 105 and coupling lenses 6 for collecting the white light $L_w$ emitted from the xenon lamp 105. Since the xenon lamp 105 generates heat in operation, the light source apparatus 102 is provided with a cooling fan 7 for carrying out forcible cooling by, for example, an air flow G. Further, a controller 108 is disposed to the light source apparatus 102 side to control a display device 110 of the projector head 103 to be described later.

The optical fiber 4 is a fiber bundle having an edge face 4a disposed to a light collecting position at which the white light $L_w$, is collected by the coupling lenses 6 and the other edge face 4b disposed to the projector head 103.

The projector head 103 includes a collimate lens 109 for collecting the white light $L_w$ transmitted by the optical fiber 4 and converting it into approximately parallel light, the transmissive liquid crystal display device 110 for causing the white light $L_w$ converted into the approximately parallel light by the collimate lens 109 to pass therethrough, a projecting lens 111 for projecting the light passed through the transmissive liquid crystal the display device 110, an aperture 112 disposed in the vicinity of the focusing position of the projecting lens, and an enlarging optical system 113 for enlarging the light passed through the aperture 112. The transmissive liquid crystal display device 110 is connected to the controller 108 through wirings 114.

Operation of the projector 101 according to the embodiment arranged as described above will be explained.

According to the projector 101 of the embodiment, the white light $L_w$ emitted from the light source apparatus 102 is transmitted to the projector head 103 through the optical fiber 4. In the projector head 103, after the white light $L_w$ emitted from the edge face 4b of the optical fiber 4 is converted into the approximately parallel light by the collimate lens 109, it is caused to pass through the transmissive liquid crystal display device 110.

The transmissive liquid crystal display device 110 is controlled by the control signal supplied from the controller 108 and displays an image according to the control signal. Accordingly, the image signal of an image to be displayed by the transmissive liquid crystal display device 110 is overlapped with the white light $L_w$ passed through the transmissive liquid crystal display device 110. After the white light $L_w$ is collected by the projecting lens 111 and its brightness is adjusted by the aperture 112, it is enlarged by the enlarging optical system 113, and the image displayed by the transmissive liquid crystal display device 110 is projected onto a projecting surface P disposed to the outside of the projector head 103.

According to the projector 101 of the embodiment, since the projector head 103 disposed in a looking/listening environment is separated from the light source apparatus 102 and connected thereto by the optical fiber 4 and the wirings 114, it is possible to dispose the light source apparatus 102 acting as a heat generating source and a noise source to the outside of the looking/listening environment. As a result, a decrease of an S/N ratio and an increase of a temperature in the looking/listening environment caused by the light source apparatus 2 can be prevented. In particular, when the projector 101 is used as a vehicle-mounted projector, it is possible to dispose the light source apparatus 102, which acts as the noise source and the heat generating source, in a trunk room and the like externally of a compartment, thereby the looking/listening environment in the small and closed compartment can be enhanced.

The projector head 103 can be reduced in size by separating the projector head 103 from the light source apparatus 102. Thus, the projector head 3 can be disposed such that it does not get in the way even in the small compartment of the vehicle and the like. Further, the projector head 103 can be turnably mounted easily by connecting the light source apparatus 102 to the projector head 103 by the flexible optical fiber 4 and the wirings 114, thereby a degree of mounting freedom can be enhanced. Further, there is also an advantage in that audiences can optionally adjust the position and the attitude of the projector head 103 in conformity with the projecting surface P.

Figure 5:
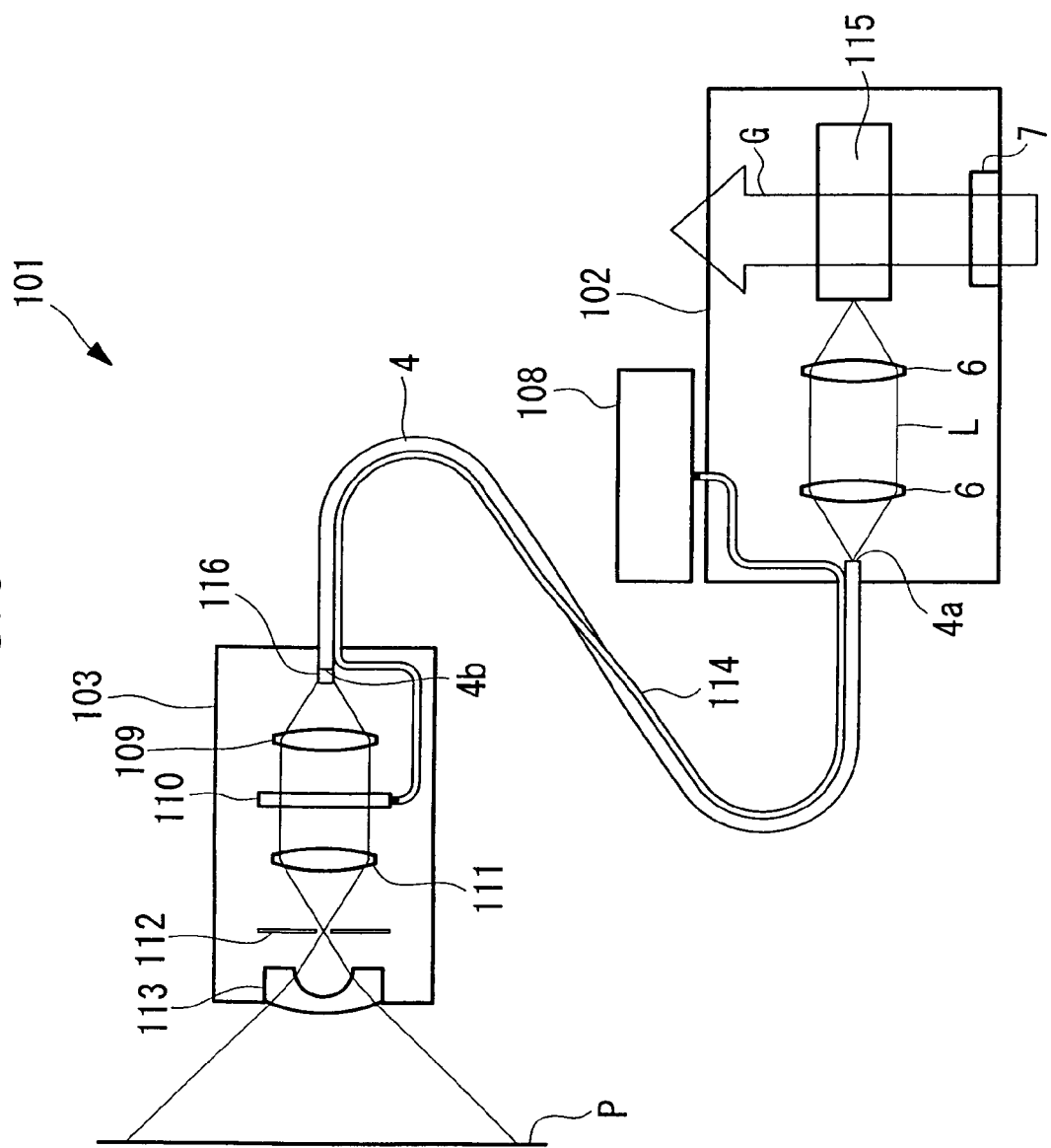
FIG. 5 is an overall arrangement view schematically showing a first modification of the projector of FIG. 4.

Note that, in the projector 101 of the embodiment, the xenon lamp 105 is employed as a light source of the light source apparatus 102, and the fiber bundle is employed as the optical fiber 4. However, as shown in FIG. 5, a laser light source 115 may be employed in place of the xenon lamp 105 and a multimode fiber material may be employed as the optical fiber 4 as well as a fluorescent illuminant 116 may be disposed in front of the edge face 4b of the optical fiber 4 to convert the laser light L into visible light. With this arrangement, since the laser light L with high brightness is transmitted to the projector head 103 and converted to the visible light by the projector head 103, there is an advantage in that a bright projected image can be obtained by overlapping an image signal with illuminating light with high brightness. Further, since the points of luminance of the edge face 4b of the optical fiber 4 disposed in the projector head 103 can be made small and bright, the projector head 103 can be more reduced in size.

Further, in this case, illuminants for converting the white light $L_1$ into visible light of 3 RGB colors may be employed as the fluorescent illuminant 116, and three laser light sources 115 and three single mode fibers 4, which supply the laser light L to the fluorescent illuminant 116, may be prepared. With this arrangement, it is possible to use all the pixels of the transmissive liquid crystal display device 110 to each of the 3 RGB colors, thereby a sophisticated image signal can be overlapped with illuminating light. Note that, in this case, the laser light source 115 must be switched in synchronism with an image which is to be displayed on the transmissive liquid crystal display device 110 and switched by the controller 108. Further, colors other than the 3 RGB colors may be emitted in addition to the three RGB colors. With this arrangement, color reproducibility can be enhanced.

Figure 6:
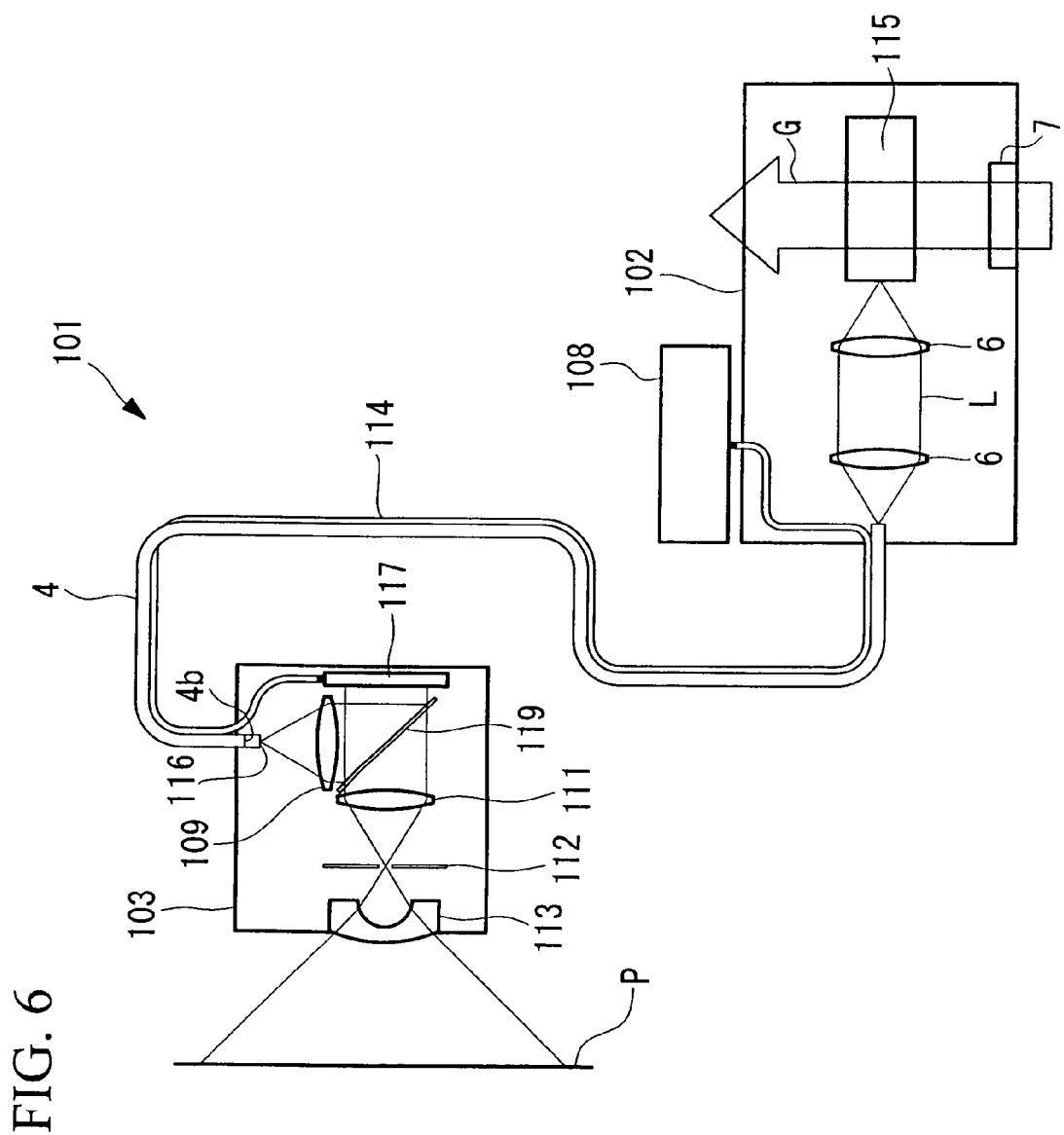
FIG. 6 is an overall arrangement view schematically showing a second modification of the projector of FIG. 4.
Figure 7:
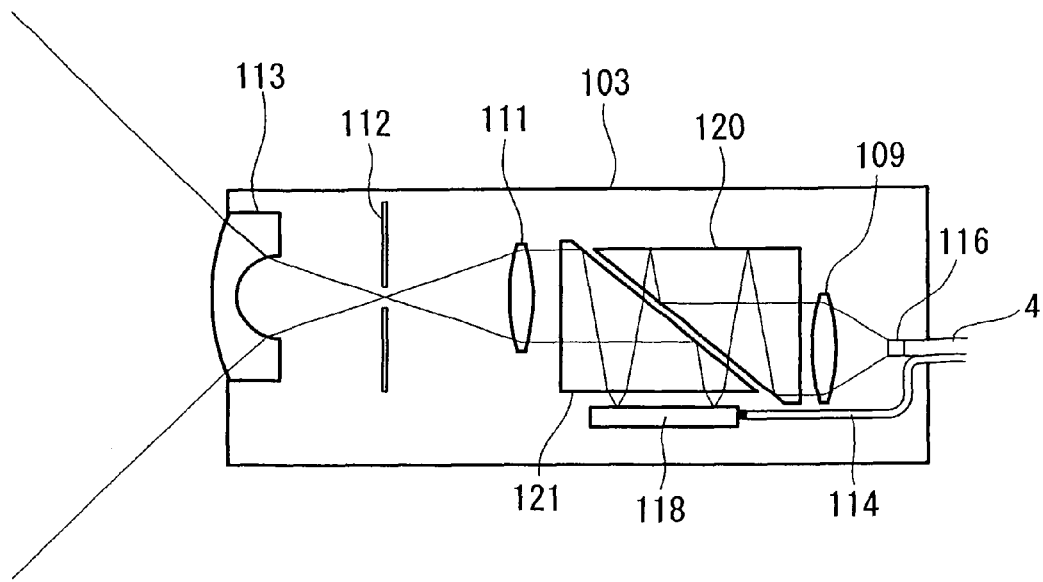
FIG. 7 is an enlarged view showing a modification of a projector head of the projector of FIG. 4.
Figure 8:
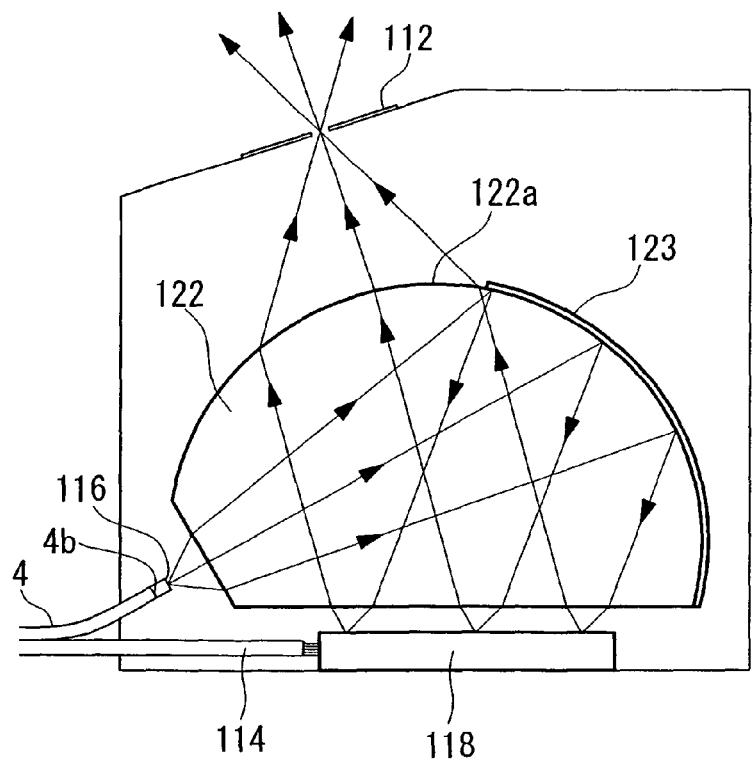
FIG. 8 is an enlarged view showing other modification of the projector head of the projector of FIG. 4.

Although the transmissive liquid crystal display device 110 is employed in the embodiment, a reflective liquid crystal display device 117 may be employed in place of it as shown in FIG. 6 or a digital micromirror device (Trademark)(DMD (Trademark)) 118 may be employed in pace of it as shown in FIGS. 7 and 8.

As shown in FIGS. 6 to 8, since a light path is returned by using the reflective display devices 117, 118, the length of the light path can be reduced, which is advantageous in that the projector head 103 can be more reduced in size in a direction along the light path length. A reference numeral 119 in FIG. 6 denotes a half mirror.

In an example shown in FIG. 7, two triangular prisms 120, 121 are disposed in confrontation with each other and combined with the digital micromirror device (Trademark) 118 to return the light path.

Further, in an example shown in FIG. 8, the collimate lens 109, the triangular prisms 120, 121 and the projecting lens 111 of FIG. 7 are composed of an integral prism 122. The laser light L emitted from the edge face 4b of the optical fiber 4 is caused to pass through the fluorescent illuminant 116 to thereby generate fluorescence, and the generated fluorescence is incident in the prism 122. The prism 122 is coated with a reflective coating 123, and the fluorescence reflected on the reflective coating 123 is incident on the digital micromirror device (Trademark) 118 in a mode of approximately parallel light. Then, the fluorescence overlapped with an image signal by the digital micromirror device (Trademark) 118 is caused to outgo from the convex surface 122a of the prism 122 while being collected thereby and projected to the outside through the aperture 112 disposed at a focusing position. With this arrangement, the projector head 103 can be arranged more compact.

In the embodiment, the projector head 103 may be used also as an illuminating apparatus by causing an image signal to pass through the display devices 110, 117, 118 without overlapping it.

Figure 9:
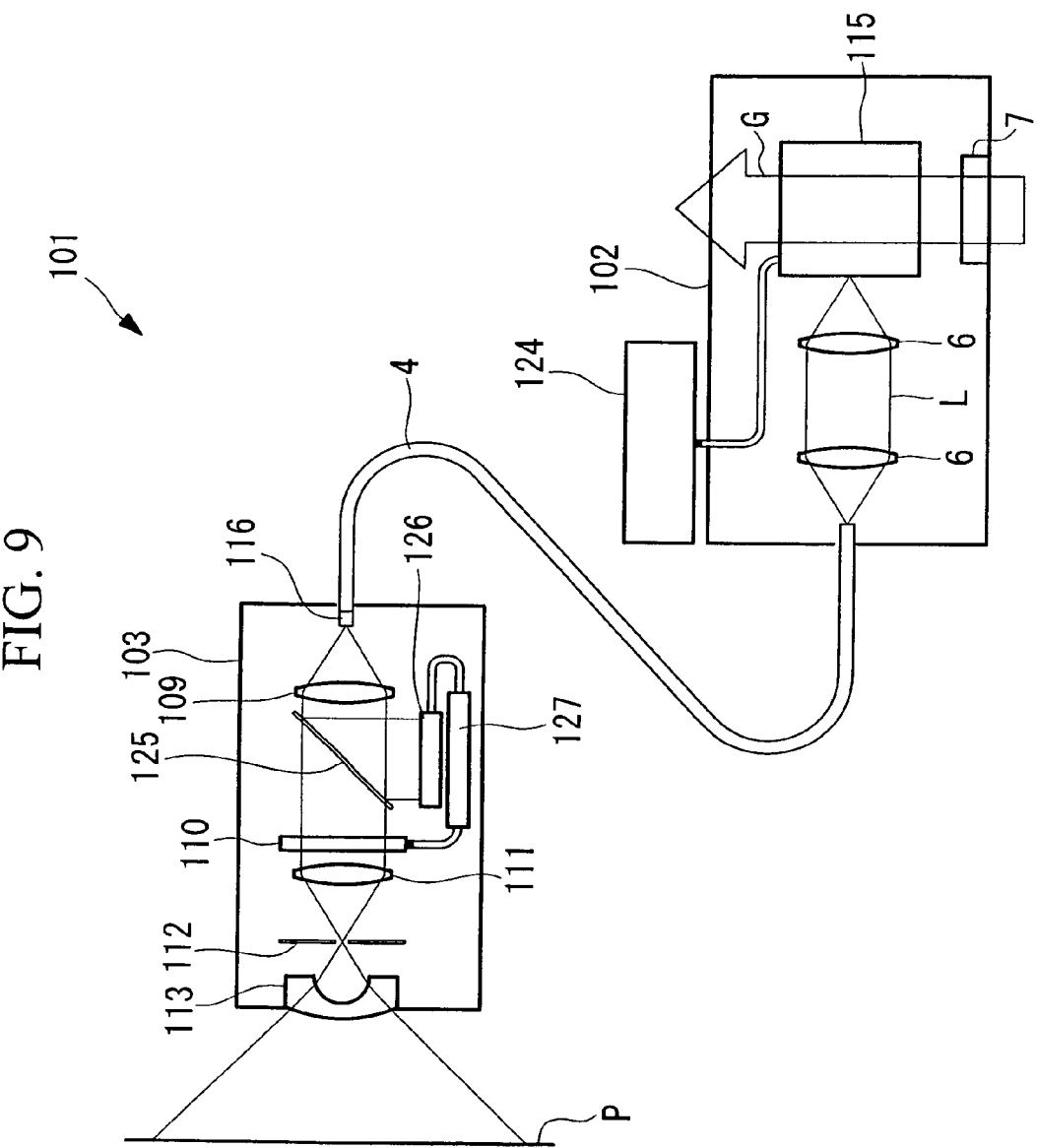
FIG. 9 is an overall arrangement view schematically showing a third modification of the projector of FIG. 4.

Further, in the embodiment, the display devices 110, 117, 118 connected by the wirings 114 are controlled by the controller 108 disposed to the light source apparatus 102 side. However, the control signal of the display device 110 may be transmitted as a light signal through the optical fiber 4 and may be converted into an electric signal by the projector head 103 in place of the above arrangement as shown in FIG. 9. In FIG. 9, a reference numeral 124 denotes a signal modulating device 124 for placing the control signal of the display device 110 on the laser light L emitted from the laser light source 115, and a reference numeral 125 denotes a half mirror for branching the visible light emitted from the edge face 4b of the optical fiber 4 in the projector head 103. Further, a reference numeral 126 denotes a light/electric conversion device for converting a light signal into an electric signal, a reference numeral 127 denotes a signal processing device for creating an image signal to be displayed by the display device 110 based on the electric signal converted by the light/electric conversion device 126.

In this case, it is sufficient for the signal modulating device 124 to place the control signal light of the display device 110 between illumination exciting light L and next illumination exciting light. The control signal light can be set to a sufficiently low and short signal level with respect to the illumination exciting light for so that it does not adversely affect an image to be displayed.

With this arrangement, the wirings 114 for connecting the light source apparatus 102 to the display device 110 can be omitted, thereby noise can be prevented from being mixed with the image signal in the wirings 114 when they are wired long. Further, when a converting device (not shown) for converting light into electric energy is disposed in the projector head 103, the power used in the projector head 103 can be also obtained from the light supplied from the light source apparatus 102, thereby the wirings to the projector head 103 including power wirings can be omitted. With this arrangement, the projector head 103 can be turnably mounted more easily.

What is claimed is:
1. A projector comprising:
a point light source disposed to an edge of an optical fiber for transmitting exciting light and comprising a fluorescent illuminant for emitting fluorescence by being exited by the exiting light;
a light collecting optical system for collecting the fluorescence emitted from the point light source;

a reflective display device for reflecting the fluorescence collected by the light collecting optical system and overlapping the fluorescence with an image signal, and an outgoing aperture for stopping down the fluorescence overlapped with the image signal by the reflective display device, wherein the outgoing aperture and the point light source are disposed side by side in the vicinity of a front focusing surface of the light collecting optical system.

2. A projector according to claim 1, wherein the fluorescent illuminant emits white fluorescence.

3. A projector according to claim 1, wherein the fluorescent illuminant emits fluorescence of at least 3 RGB colors.

4. A projector according to claim 1, wherein the reflective display device is a digital micromirror device (Trademark).

5. A projector according to claim 1, wherein the reflective display device is a reflective liquid crystal display device.

* * * * *